US010373004B1

United States Patent
Kim et al.

(10) Patent No.: US 10,373,004 B1
(45) Date of Patent: Aug. 6, 2019

(54) METHOD AND DEVICE FOR DETECTING LANE ELEMENTS TO PLAN THE DRIVE PATH OF AUTONOMOUS VEHICLE BY USING A HORIZONTAL FILTER MASK, WHEREIN THE LANE ELEMENTS ARE UNIT REGIONS INCLUDING PIXELS OF LANES IN AN INPUT IMAGE

(71) Applicant: Stradvision, Inc., Gyeongbuk (KR)

(72) Inventors: Kye-Hyeon Kim, Seoul (KR);
Yongjoong Kim, Gyeongsangbuk-do (KR); Insu Kim, Gyeongsangbok-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

(21) Appl. No.: 16/263,123

(22) Filed: Jan. 31, 2019

(51) Int. Cl.
*G06K 9/00* (2006.01)
*G06T 7/73* (2017.01)
(Continued)

(52) U.S. Cl.
CPC ............ *G06K 9/00798* (2013.01); *G06T 7/73* (2017.01); *G08G 1/04* (2013.01); *G08G 1/167* (2013.01);
(Continued)

(58) Field of Classification Search
CPC ...... G06K 9/00798; G08G 1/04; G08G 1/167; G06T 7/73; G06T 2207/20084; G06T 2207/30256; G06T 2207/10016
See application file for complete search history.

(56) References Cited

U.S. PATENT DOCUMENTS 10,223,614 B1 * 3/2019 Kim .................... G06K 9/6262
10,229,346 B1 * 3/2019 Kim .................... G06K 9/6262
(Continued)

OTHER PUBLICATIONS

Badrinarayanan et al., SegNet: A Deep Convolutional Encoder-Decoder Architecture for Image Segmentation, IEEE Transactions on Pattern Analysis and Machine Intelligence, Dec. 2017.*
(Continued)

*Primary Examiner* — John B Strege
(74) *Attorney, Agent, or Firm* — Husch Blackwell LLP

(57) ABSTRACT

A method for detecting lane elements, which are unit regions including pixels of lanes in an input image, to plan the drive path of an autonomous vehicle by using a horizontal filter mask is provided. The method includes steps of: a computing device acquiring a segmentation score map from a CNN using the input image; instructing a post-processing module, capable of performing data processing at an output end of the CNN, to generate a magnitude map by using the segmentation score map and the horizontal filter mask; instructing the post-processing module to determine each of lane element candidates per each of rows of the segmentation score map by referring to values of the magnitude map; and instructing the post-processing module to apply estimation operations to each of the lane element candidates per each of the rows, to thereby detect each of the lane elements.

20 Claims, 5 Drawing Sheets
(1 of 5 Drawing Sheet(s) Filed in Color)

(51) Int. Cl.
*G08G 1/16* (2006.01)
*G08G 1/04* (2006.01)

(52) U.S. Cl.
CPC ............. *G06T 2207/10016* (2013.01); *G06T 2207/20084* (2013.01); *G06T 2207/30256* (2013.01)

(56) References Cited

U.S. PATENT DOCUMENTS

| | | | | |
|---|---|---|---|---|
| 2015/0310277 | A1* | 10/2015 | Schertler | G06K 9/0063 382/128 |
| 2017/0011281 | A1* | 1/2017 | Dijkman | G06K 9/66 |
| 2017/0124415 | A1* | 5/2017 | Choi | G06N 3/08 |
| 2018/0181817 | A1* | 6/2018 | Yan | G06N 3/02 |
| 2018/0283892 | A1* | 10/2018 | Behrendt | G01C 21/3673 |
| 2018/0285659 | A1* | 10/2018 | Kwant | G06K 9/00798 |
| 2019/0012548 | A1* | 1/2019 | Levi | G06K 9/00791 |

OTHER PUBLICATIONS

Sun et al., Face detection using deep learning: an improved faster RCNN approach, Elsevier B.V., Mar. 2018.*
Ren et al., Faster R-CNN: Towards Real-Time Object Detection with Region Proposal Networks, 2015.*
Du et al., Fused DNN: A deep neural network fusion approach to fast and robust pedestrian detection, IEEE, 2017.*
Girshick et al., Fast R-CNN, 2015.*

* cited by examiner

US 10,373,004 B1

METHOD AND DEVICE FOR DETECTING LANE ELEMENTS TO PLAN THE DRIVE PATH OF AUTONOMOUS VEHICLE BY USING A HORIZONTAL FILTER MASK, WHEREIN THE LANE ELEMENTS ARE UNIT REGIONS INCLUDING PIXELS OF LANES IN AN INPUT IMAGE

FIELD OF THE DISCLOSURE

The present disclosure relates to a method and a device for use with an autonomous vehicle; and more particularly, to the method and the device for detecting lane elements to plan the drive path of an autonomous vehicle.

BACKGROUND OF THE DISCLOSURE

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network became a very useful tool in the field of the machine learning.

Meanwhile, image segmentation is a method of generating a label image by using an image, e.g., a training image or a test image as an input. As the deep learning has become popular recently, the deep learning is frequently used for the segmentation.

Recently, the post-processing is frequently used in the deep CNNs. The CNN plays several roles in an autonomous driving module. One of such roles is to detect one or more lanes in an input image. By detecting the lanes, a free space for vehicles to drive through may be detected, or vehicles may be appropriately controlled to drive on the center of a road.

However, if the result only from the deep CNNs is used, the performance of lane detection is not very useful. Hence, the lane detection is often achieved by post-processing the result from the deep CNNs. But, the lane detection by determining whether each pixel is included in the lanes does not have a good result when compared with the lane detection by setting at least one unit region included in the lanes.

SUMMARY OF THE DISCLOSURE

It is an object of the present disclosure to solve all the aforementioned problems.

It is another object of the present disclosure to detect one or more lanes easily by detecting one or more lane elements, which are one or more unit regions including pixels of the lanes in at least one input image, using at least one horizontal filter mask.

It is still another object of the present disclosure to provide one or more estimating methods for detecting the lane elements more easily.

In accordance with one aspect of the present disclosure, there is provided a method for detecting one or more lane elements, which are one or more unit regions including pixels of one or more lanes in at least one input image, by using at least one horizontal filter mask, including steps of: (a) a computing device, if a CNN (convolutional neural network) generates at least one segmentation score map by using the input image, acquiring the segmentation score map; (b) the computing device instructing at least one post-processing module, capable of performing data processing at an output end of the CNN, to generate at least one magnitude map by using (i) the segmentation score map and (ii) the horizontal filter mask including a plurality of filtering parameters; (c) the computing device instructing the post-processing module to determine each of one or more lane element candidates per each of rows of the segmentation score map by referring to values of the magnitude map; and (d) the computing device instructing the post-processing module to apply one or more estimation operations to each of the lane element candidates per each of the rows, to thereby detect each of the lane elements.

As one example, at the step of (b), the computing device instructs the post-processing module to generate the magnitude map by converting values of the segmentation score map through the horizontal filter mask.

As one example, assuming that coordinates of values included in a k-th row on the segmentation score map whose size is m×n are (x, k), where x is an integer varying from 1 to m, and k is selected among integers from 1 to n, the computing device instructs the post-processing module to generate the magnitude map which has a same size with the segmentation score map by calculating values of (x, k) on the magnitude map, wherein (i) if x is from 2 to m−1, each of the values of (x, k) on the magnitude map is each of sums of elements of each of element-wise products generated by multiplying values of (x−1, k), (x, k), and (x+1, k) on the segmentation score map and values of [−1, 0, 1] included in the horizontal filter mask, respectively, (ii) if x equals to 1, a value of (x, k) on the magnitude map is a sum of elements of each of element-wise products generated by multiplying values of (x, k) and (x+1, k) on the segmentation score map and values of [0, 1], included in the horizontal filter mask, respectively, and (iii) if x equals to m, a value of (x, k) on the magnitude map is a sum of elements of each of element-wise product generated by multiplying values of (x−1, k) and (x, k) on the segmentation score map and values of [−1, 0], included in the horizontal filter mask, respectively.

As one example, at the step of (c), the computing device instructs the post-processing module to detect each of initial left boundary coordinates and each of initial right boundary coordinates of each of the lane element candidates per each of the rows by referring to each of absolute values and each of signs of each of the values of the magnitude map corresponding to each of the rows of the segmentation score map, to thereby determine each of the lane element candidates per each of the rows.

As one example, the computing device instructs the post-processing module to determine each of extended lane element candidates per each of the rows by referring to each of adjusted left boundary coordinates and each of adjusted right boundary coordinates whose distances from each of centers of each of the lane element candidates per each of the rows are determined as multiples of distances from each of the centers thereof to each of the initial left boundary coordinates and to each of the initial right boundary coordinates respectively.

As one example, at the step of (c), the computing device instructs the post-processing module to determine each of the lane element candidates per each of the rows by detecting each of initial left boundary coordinates and each of initial right boundary coordinates of each of the lane element candidates, and, at the step of (d), the computing device instructs the post-processing module to apply the estimation operations to each of the lane element candidates per each of the rows, wherein the estimation operations are performed such that (i) each of reference coordinates of each of the lane element candidates per each of the rows is determined as each of coordinates whose value is largest among each of values, on the segmentation map, of each of the lane element candidates per each of the rows larger than a first threshold, and (ii) each of final left boundary coordinates is determined as each of coordinates, whose value is close to a second threshold within a predetermined range, on the left side of each of the reference coordinates, and each of final right boundary coordinates is determined as each of coordinates, whose value is close to a third threshold within a predetermined range, on the right side of each of the reference coordinates.

As one example, the computing device instructs the post-processing module (i) to determine each of reference coordinate candidates whose value is larger than the first threshold among each of the values of each of the lane element candidates per each of the rows of the segmentation score map and (ii) to detect each largest value among each of values of each of the reference coordinate candidates by repeating a process of eliminating each of some values, which is smaller than either its left one or right one, among each of the values of each of the reference coordinate candidates, to thereby determine each of coordinates corresponding to said each largest value as each of the reference coordinates of each of the lane element candidates per each of the rows.

As one example, at the step of (c), the computing device instructs the post-processing module to determine each of the lane element candidates per each of the rows by detecting each of initial left boundary coordinates and each of initial right boundary coordinates of each of the lane element candidates, and, at the step of (d), the computing device instructs the post-processing module to apply the estimation operations to each of the lane element candidates per each of the rows, wherein the estimation operations are performed such that (i) each sample width per each of the rows of the segmentation score map is determined by referring to information on a predetermined lane width, (ii) each of sub groups, whose width corresponds to said each sample width, is generated by using each of values of each of the lane element candidates per each of the rows on the segmentation score map, (iii) each difference is calculated between each of averages of each of values included in each of the sub groups and that of values, on the segmentation score map, which are not included in said each of the sub groups, to thereby determine each of representative sub groups per each of the rows, and (iv) each of final left boundary coordinates is determined as each of coordinates whose value is close to a threshold value within a predetermined range in a left part of each of the representative sub groups, and each of final right boundary coordinates is determined as each of coordinates whose value is close to the threshold value within a predetermined range in a right part of each of the representative sub groups.

As one example, at the step of (c), the computing device instructs the post-processing module to determine each of the lane element candidates per each of the rows by detecting each of initial left boundary coordinates and each of initial right boundary coordinates of each of the lane element candidates, and, at the step of (d), the computing device instructs the post-processing module to apply the estimation operations to each of the lane element candidates per each of the rows, wherein the estimation operations are performed such that each maximum sum subarray is determined where each of sums of deviation values of each of the lane element candidates per each of the rows is largest, and each of final left boundary coordinates and each of final right boundary coordinates are determined respectively as each of leftmost coordinates and each of rightmost coordinates in said each maximum sum subarray.

As one example, at the step of (c), the computing device instructs the post-processing module to determine each of the lane element candidates per each of the rows by detecting each of initial left boundary coordinates and each of initial right boundary coordinates of each of the lane element candidates, and, at the step of (d), the computing device instructs the processing module to detect each of final left boundary coordinates and each of final right boundary coordinates of each of the lane element candidates per each of the rows by applying the estimation operations to the segmentation score map, and refer to each of the final left boundary coordinates and each of the final right boundary coordinates of each of the lane element candidates per each of the rows, to thereby generate each of the lane elements.

In accordance with another aspect of the present disclosure, there is provided a computing device for detecting one or more lane elements, which are one or more unit regions including pixels of one or more lanes in at least one input image, by using at least one horizontal filter mask, including: at least one memory that stores instructions; and at least one processor configured to execute the instructions to: perform processes of (I) instructing at least one post-processing module, capable of performing data processing at an output end of a CNN, to generate at least one magnitude map by using (i) the segmentation score map which has been generated through the CNN by using the input image and (ii) the horizontal filter mask including a plurality of filtering parameters, (II) instructing the post-processing module to determine each of one or more lane element candidates per each of rows of the segmentation score map by referring to values of the magnitude map, and (III) instructing the post-processing module to apply one or more estimation operations to each of the lane element candidates per each of the rows, to thereby detect each of the lane elements.

As one example, at the process of (I), the processor instructs the post-processing module to generate the magnitude map by converting values of the segmentation score map through the horizontal filter mask.

As one example, assuming that coordinates of values included in a k-th row on the segmentation score map whose size is m×n are (x, k), where x is an integer varying from 1 to m, and k is selected among integers from 1 to n, the processor instructs the post-processing module to generate the magnitude map which has a same size with the segmentation score map by calculating values of (x, k) on the magnitude map, wherein (i) if x is from 2 to m−1, each of the values of (x, k) on the magnitude map is each of sums of elements of each of element-wise products generated by multiplying values of (x−1, k), (x, k), and (x+1, k) on the segmentation score map and values of [−1, 0, 1] included in the horizontal filter mask, respectively, (ii) if x equals to 1, a value of (x, k) on the magnitude map is a sum of elements of each of element-wise products generated by multiplying values of (x, k) and (x+1, k) on the segmentation score map and values of [0, 1], included in the horizontal filter mask, respectively, and (iii) if x equals to m, a value of (x, k) on the magnitude map is a sum of elements of each of element-wise product generated by multiplying values of (x−1, k) and (x, k) on the segmentation score map and values of [−1, 0], included in the horizontal filter mask, respectively.

As one example, at the process of (II), the processor instructs the post-processing module to detect each of initial left boundary coordinates and each of initial right boundary coordinates of each of the lane element candidates per each of the rows by referring to each of absolute values and each of signs of each of the values of the magnitude map corresponding to each of the rows of the segmentation score map, to thereby determine each of the lane element candidates per each of the rows.

As one example, the processor instructs the post-processing module to determine each of extended lane element candidates per each of the rows by referring to each of adjusted left boundary coordinates and each of adjusted right boundary coordinates whose distances from each of centers of each of the lane element candidates per each of the rows are determined as multiples of distances from each of the centers thereof to each of the initial left boundary coordinates and to each of the initial right boundary coordinates respectively.

As one example, at the process of (II), the processor instructs the post-processing module to determine each of the lane element candidates per each of the rows by detecting each of initial left boundary coordinates and each of initial right boundary coordinates of each of the lane element candidates, and, at the process of (III), the processor instructs the post-processing module to apply the estimation operations to each of the lane element candidates per each of the rows, wherein the estimation operations are performed such that (i) each of reference coordinates of each of the lane element candidates per each of the rows is determined as each of coordinates whose value is largest among each of values, on the segmentation map, of each of the lane element candidates per each of the rows larger than a first threshold, and (ii) each of final left boundary coordinates is determined as each of coordinates, whose value is close to a second threshold within a predetermined range, on the left side of each of the reference coordinates, and each of final right boundary coordinates is determined as each of coordinates, whose value is close to a third threshold within a predetermined range, on the right side of each of the reference coordinates.

As one example, the processor instructs the post-processing module (i) to determine each of reference coordinate candidates whose value is larger than the first threshold among each of the values of each of the lane element candidates per each of the rows of the segmentation score map and (ii) to detect each largest value among each of values of each of the reference coordinate candidates by repeating a process of eliminating each of some values, which is smaller than either its left one or right one, among each of the values of each of the reference coordinate candidates, to thereby determine each of coordinates corresponding to said each largest value as each of the reference coordinates of each of the lane element candidates per each of the rows.

As one example, at the process of (II), the processor instructs the post-processing module to determine each of the lane element candidates per each of the rows by detecting each of initial left boundary coordinates and each of initial right boundary coordinates of each of the lane element candidates, and, at the process of (III), the processor instructs the post-processing module to apply the estimation operations to each of the lane element candidates per each of the rows, wherein the estimation operations are performed such that (i) each sample width per each of the rows of the segmentation score map is determined by referring to information on a predetermined lane width, (ii) each of sub groups, whose width corresponds to said each sample width, is generated by using each of values of each of the lane element candidates per each of the rows on the segmentation score map, (iii) each difference is calculated between each of averages of each of values included in each of the sub groups and that of values, on the segmentation score map, which are not included in said each of the sub groups, to thereby determine each of representative sub groups per each of the rows, and (iv) each of final left boundary coordinates is determined as each of coordinates whose value is close to a threshold value within a predetermined range in a left part of each of the representative sub groups, and each of final right boundary coordinates is determined as each of coordinates whose value is close to the threshold value within a predetermined range in a right part of each of the representative sub groups.

As one example, at the process of (II), the processor instructs the post-processing module to determine each of the lane element candidates per each of the rows by detecting each of initial left boundary coordinates and each of initial right boundary coordinates of each of the lane element candidates, and, at the process of (III), the processor instructs the post-processing module to apply the estimation operations to each of the lane element candidates per each of the rows, wherein the estimation operations are performed such that each maximum sum subarray is determined where each of sums of deviation values of each of the lane element candidates per each of the rows is largest, and each of final left boundary coordinates and each of final right boundary coordinates are determined respectively as each of leftmost coordinates and each of rightmost coordinates in said each maximum sum subarray.

As one example, at the process of (II), the processor instructs the post-processing module to determine each of the lane element candidates per each of the rows by detecting each of initial left boundary coordinates and each of initial right boundary coordinates of each of the lane element candidates, and, at the process of (III), the processor instructs the processing module to detect each of final left boundary coordinates and each of final right boundary coordinates of each of the lane element candidates per each of the rows by applying the estimation operations to the segmentation score map, and refer to each of the final left boundary coordinates and each of the final right boundary coordinates of each of the lane element candidates per each of the rows, to thereby generate each of the lane elements.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
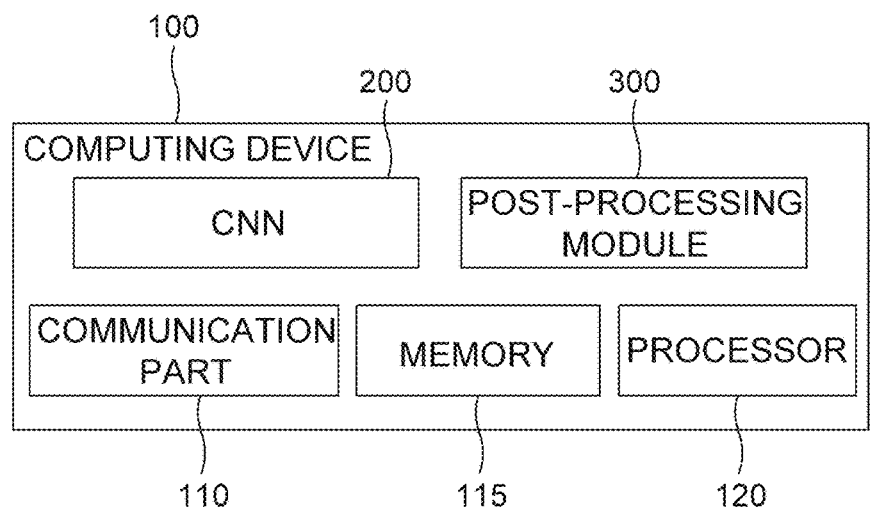
FIG. 1 is a drawing illustrating a configuration of a computing device capable of detecting one or more lane elements, which are one or more unit regions including pixels of one or more lanes in at least one input image, by using at least one horizontal filter mask.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

FIG. 1 is a drawing illustrating a configuration of a computing device capable of detecting one or more lane elements, which are one or more unit regions including pixels of one or more lanes in at least one input image, by using at least one horizontal filter mask. For reference, the lanes in this specification may be refer to lane marks.

Referring to FIG. 1, the computing device 100 may include a convolutional neural network (CNN) 200 and a post-processing module 300. The computation processes of the CNN 200 and the post-processing module 300 may be performed by a communication part 110 and a processor 120. However, a detailed connection between the communication part 110 and the processor 120 is omitted in FIG. 1. In addition, the computing device may further include a memory 115 capable of storing computer readable instructions for performing following processes. As one example, the processor, the memory, a medium, etc. may be integrated with an integrated processor.

The configuration of the computing device 100 performing a method for detecting the lane elements, which are the unit regions including the pixels of the lanes in the input image, by using the horizontal filter mask of the present disclosure has been described above. Hereinafter, the method for detecting the lane elements in accordance with the present disclosure will be described by referring to FIG. 2.

Figure 2:
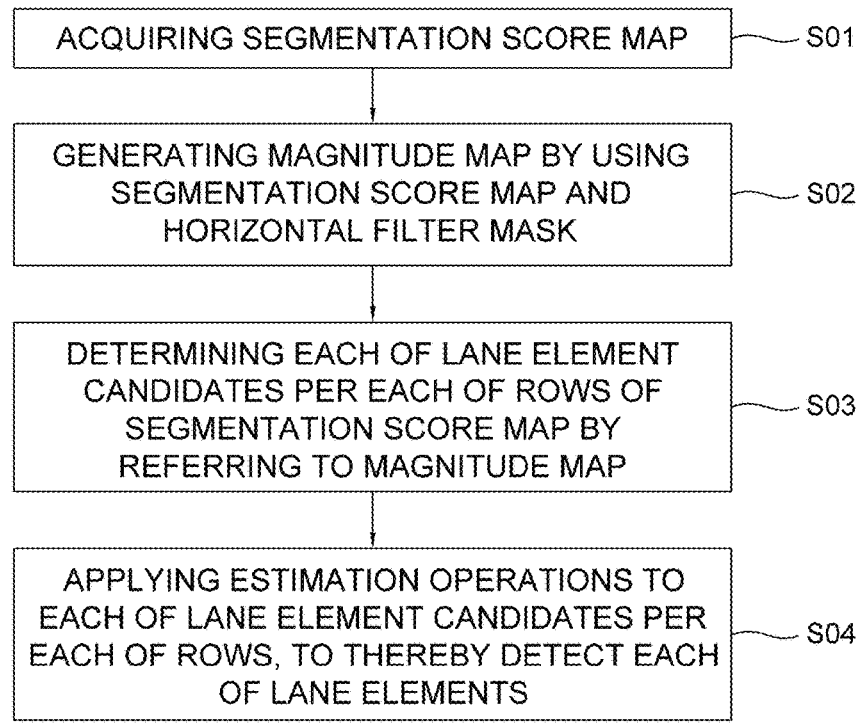
FIG. 2 is a flow chart illustrating a process of detecting the lane elements in accordance with one example embodiment of the present disclosure.

FIG. 2 is a flow chart illustrating a process of detecting the lane elements in accordance with one example embodiment of the present disclosure.

Referring to FIG. 2, if the CNN 200 generates at least one segmentation score map by using the input image, the communication part 110 may acquire the segmentation score map at a step of S01. Then, the post-processing module 300 may generate at least one magnitude map by using the segmentation score map and the horizontal filter mask at a step of S02. Thereafter, the post-processing module 300 may determine each of one or more lane element candidates per each of rows of the segmentation score map by referring to the magnitude map at a step of S03. Lastly, the post-processing module may apply one or more estimation operations to each of the lane element candidates per each of the rows, to thereby detect one or more lane elements at a step of S04.

The method for detecting the lane elements in accordance with one example embodiment of the present disclosure illustrated in FIG. 2 will be described in more detail below.

First of all, if the CNN 200 generates the segmentation score map by using the input image, the computing device 100 may acquire the segmentation score map.

The segmentation score map may be generated through the CNN 200 by applying one or more convolution operations and one or more deconvolution operations to the input image.

Thereafter, the computing device 100 may instruct the post-processing module, capable of performing data processing at an output end of the CNN 200, to generate the magnitude map by using the segmentation score map and the horizontal filter mask which includes a plurality of filtering parameters.

A function of the horizontal filter mask is to convert values included in the segmentation score map and generate the magnitude map where the converted values are included. The horizontal filter mask may be in the form of a matrix [−1, 0, 1], but not limited thereto.

A process of generating the magnitude map by using the horizontal filter mask in the form of [−1, 0, 1] in accordance with the present disclosure will be described by referring to FIG. 3.

Figure 3:
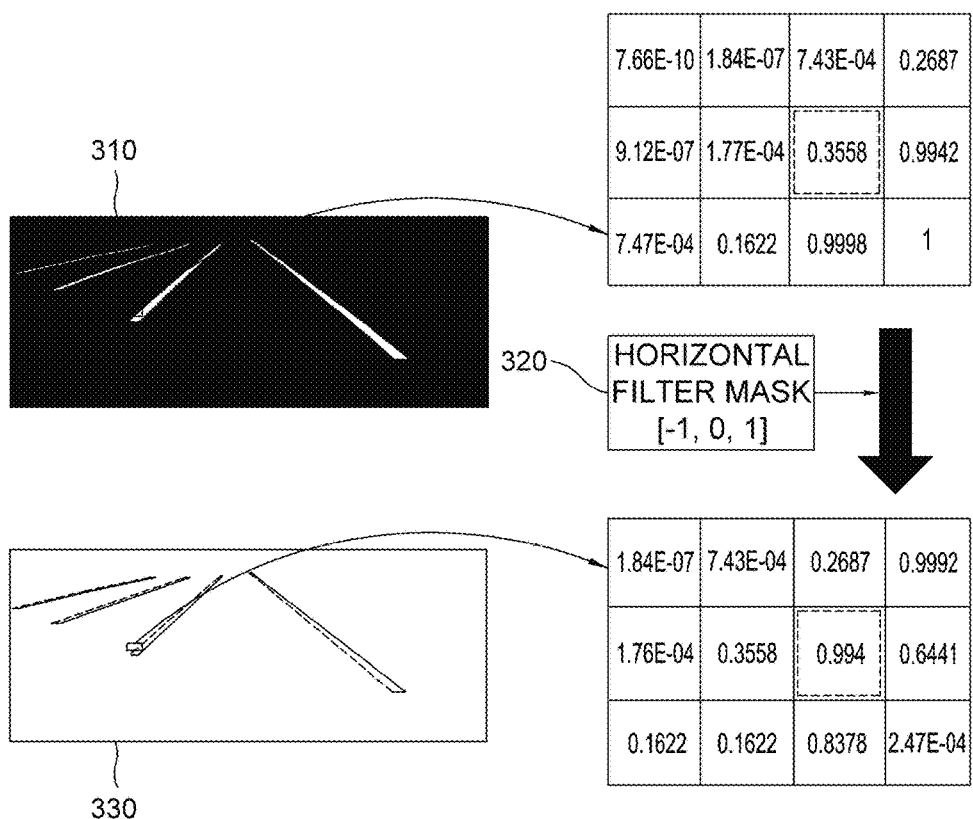
FIG. 3 is an exemplary diagram illustrating at least one segmentation score map, a horizontal filter mask, and at least one magnitude map in accordance with one example embodiment of the present disclosure.

FIG. 3 is an exemplary diagram illustrating the segmentation score map, the horizontal filter mask, and the magnitude map in accordance with one example embodiment of the present disclosure.

Referring to FIG. 3, it can be seen that the values of the segmentation score map 310 correspond one to one with values of the magnitude map 330. For example, 0.3558 in a rectangle with a dashed line on the segmentation score map 310 and 0.994 in a rectangle with a dashed line on the magnitude map 330 correspond to each other. Also, it can be seen that the magnitude map 330 may be generated by applying one or more operations using the horizontal filter mask 320 to the segmentation score map 310.

To explain a process of generating the values of the magnitude map, the segmentation score map may be assumed to have a size of m×n, and coordinates of values included in a k-th row on the segmentation score map may be assumed to be (x, k), where x is an integer varying from 1 to m, and k is selected among integers from 1 to n.

Herein, if x is from 2 to m−1, each of values of (x, k) on the magnitude map is each of sums of elements of each of element-wise products generated by multiplying values of (x−1, k), (x, k), and (x+1, k) on the segmentation score map and values of [−1, 0, 1] included in the horizontal filter mask, respectively. (ii) If x equals to 1, a value of (x, k) on the magnitude map is a sum of elements of each of element-wise products generated by multiplying values of (x, k) and (x+1, k) on the segmentation score map and values of [0, 1] included in the horizontal filter mask, respectively. (iii) If x equals to m, a value of (x, k) on the magnitude map is a sum of elements of each of element-wise product generated by multiplying values of (x−1, k) and (x, k) on the segmentation score map and values of [−1, 0] included in the horizontal filter mask, respectively.

These processes may be performed to predict boundaries of the lanes. As an ideal case, the values of the segmentation score map may be represented as 1 at the pixels of the lanes, and as 0 at non-lane pixels. Herein, the values of the magnitude map may be acquired by (−1, 0, 1)·(0, 1, 1)=1 at left boundaries of the lanes and (−1, 0, 1)·(1, 1, 0)=−1 at right boundaries of the lanes by using the horizontal filter mask. The values of the magnitude map may be acquired by (−1, 0, 1)·(1, 1, 1)=0 at internal parts of the lanes and (−1, 0, 1)·(0, 0, 0)=0 at external parts of the lanes. Finally, if values with large absolute values are generated on the magnitude map, pixels corresponding to the values with large absolute values may be determined as pixels of the boundaries of the lanes. Further, it may be confirmed whether the detected boundaries are the left boundaries or the right boundaries by detecting signs of the values with large absolute values.

By referring to FIG. 3 again, 0.994 in the rectangle with the dashed line on the magnitude map 330 may be acquired by (−1, 0, 1)·(1.77e-04, 0.3558, 0.9942)=0.994 as explained above. Herein, it can be seen that the boundaries of the lanes are well detected by referring to a visualized drawing of the magnitude map 330 where values of the magnitude map close to 1 are represented by dashed lines and values of the magnitude map close to −1 are represented by solid lines.

If the magnitude map representing the predicted boundaries of the lanes is generated through the method described above, the computing device 100 may instruct the post-process module 300 to determine each of the lane element candidates per each of the row of the segmentation score map by referring to the values of the magnitude map.

Herein, the computing device 100 may instruct the post-processing module 300 to detect each of initial left boundary coordinates and each of initial right boundary coordinates of each of the lane element candidates per each of the rows by referring to each of absolute values and each of signs of each of the values of the magnitude map corresponding to each of the rows of the segmentation score map, to thereby determine each of the lane element candidates per each of the rows.

Taking FIG. 3 as an example, values in a middle row of the magnitude map 330 are 1.76E-04, 0.3558, 0.994, and 0.6441. These values are positive numbers because they correspond to a left boundary of a lane, and a largest value close to 1 on the magnitude map 330 corresponds to a pixel nearest to the left boundary. Values corresponding to pixels of a right boundary may have similar absolute values but in negative numbers.

Herein, the post-processing module 300 may determine local maximum values by referring to absolute values of the values of the magnitude map one by one. In the magnitude map 330 of FIG. 3, 0.994 may be one of the local maximum values. The local maximum values may correspond to the initial left boundary coordinates and the initial right boundary coordinates of the lane element candidates and may be determined whether they correspond to the initial left boundary coordinates or the initial right boundary coordinates, depending on their signs. If the local maximum values on the magnitude map are positive, they may correspond to the initial left boundary coordinates, and if the local maximum values on the magnitude map are negative, they may correspond to the initial right boundary coordinates. In FIG. 3, a location, on the segmentation score map 310, corresponding to 0.994 may be one of the initial left boundary coordinates. Each of the lane element candidates per each of the rows may be determined by detecting each of the initial left boundary coordinates and each of the initial right boundary coordinates as stated above.

Meanwhile, the computing device 100 may instruct the post-processing module 300 to determine each of extended lane element candidates per each of the rows by referring to each of adjusted left boundary coordinates and each of adjusted right boundary coordinates whose distances from each of centers of each of the lane element candidates per each of the rows are determined as multiples of distances from each of the centers of each of the lane element candidates to each of the initial left boundary coordinates and to each of the initial right boundary coordinates respectively. An example of the extended lane element candidates is illustrated in FIG. 4.

Figure 4:
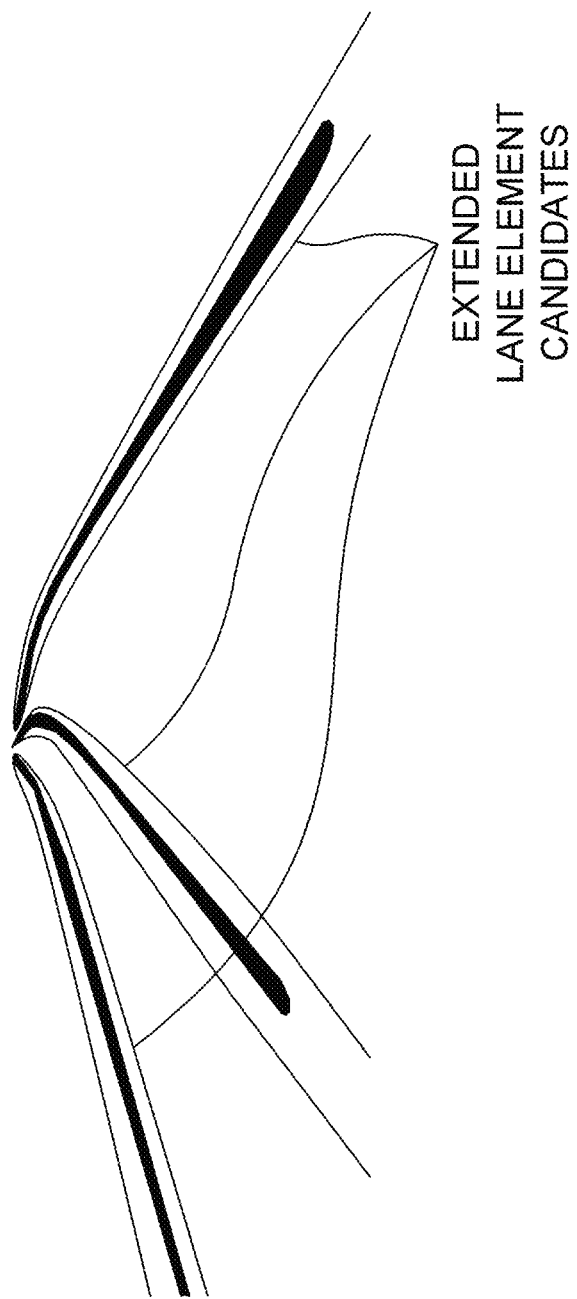
FIG. 4 is an exemplary drawing illustrating lane element candidates in accordance with one example embodiment of the present disclosure.

By referring to FIG. 4, it can be seen that the extended lane element candidates are determined wider than areas of actual lanes. By determining the extended lane element candidates, the lane elements can be detected more accurately through following processes.

If the lane element candidates are determined, the computing device 100 may instruct the post-processing module 300 to apply the estimation operations to each of the lane element candidates per each of the rows, to thereby detect each of the lane elements.

Various methods may be adopted as the estimation operations. In this detailed description, three methods will be exemplarily suggested, but the present disclosure is not limited thereto.

First, the computing device 100 may instruct the post-processing module 300 to apply the estimation operations to each of the lane element candidates per each of the rows, wherein the estimation operations may be performed such that (i) each of reference coordinates of each of the lane element candidates per each of the rows is determined as each of coordinates whose value is largest among each of values, on the segmentation map, of each of the lane element candidates per each of the rows larger than a first threshold, and (ii) each of final left boundary coordinates is determined as each of coordinates, whose value is close to a second threshold within a predetermined range, on the left side of each of the reference coordinates, and each of final right boundary coordinates is determined as each of coordinates, whose value is close to a third threshold within a predetermined range, on the right side of each of the reference coordinates. The second threshold and the third threshold may be the same, but not limited thereto.

Basically, each of the values on the segmentation score map may represent each probability of its corresponding pixel being one of the pixels of the lanes. Therefore, it is expected that the lanes can be detected more accurately by referring to coordinates corresponding to large probability values.

However, as 1 is a maximum possible value on the segmentation score map, there may be a plurality of coordinates corresponding to the largest value among the values of each of the lane element candidates per each of the rows. In this case, each of coordinates in the midst of each of the lane element candidates will be detected as each of the reference coordinates.

There may be various methods to find the largest value in order to detect each of the reference coordinates of each of the lane element candidates. An exemplary method to find the largest value will be described below.

The computing device 100 may instruct the post-processing module 300 to determine each of reference coordinate candidates whose value is larger than the first threshold among each of the values of each of the lane element candidates per each of the rows of the segmentation score map. Then, the computing device 100 may instruct the post-processing module 300 to detect each largest value among each of values of each of the reference coordinate candidates by repeating a process of eliminating each of some values, which is smaller than either its left one or its right one, among each of the values of each of the reference coordinate candidates, to thereby determine each of coordinates corresponding to said each largest value as each of the reference coordinates of each of the lane element candidates per each of the rows.

Next, another example of the estimation operations is explained below. The computing device 100 may instruct the post-processing module 300 to determine each sample width per each of the rows of the segmentation score map by referring to information on a predetermined lane width. Also, each of sub groups, whose width corresponds to said each sample width, is generated by using each of values, on the segmentation score map, of each of the lane element candidates per each of the rows, and then each difference is calculated between each of averages of each of values, on the segmentation score map, included in each of the sub groups and that of values, on the segmentation score map, which are not included in said each of the sub groups, to thereby determine each of representative sub groups per each of the rows. Further, each of the final left boundary coordinates is determined as each of coordinates whose value is close to a threshold value within a predetermined range in a left part of each of the representative sub groups, and each of the final right boundary coordinates is determined as each of coordinates whose value is close to the threshold value within a predetermined range in a right part of each of the representative sub groups.

Each of the representative sub groups is determined as where each difference between each of the averages of each of the values included in each of the sub groups and that of the values not included in said each of the sub groups is largest. Thus, the lanes may be detected more accurately by distinguishing values close to 1, corresponding to the lane, from values close to 0, not corresponding to the lane. Similarly to this, the lanes may be detected by determining the representative sub group as where variation of values included therein are smallest, also thereby distinguishing the pixels of the lane from the non-lane pixels.

Next, still another example of the estimation operations is explained below. The computing device 100 may instruct the post-processing module 300 to apply the estimation operations to each of the lane element candidates per each of the rows, wherein the estimation operations are performed such that each maximum sum subarray is determined where each of sums of deviation values of each of the lane element candidates per each of the rows is largest, and each of the final left boundary coordinates and each of the final right boundary coordinates are determined respectively as each of leftmost coordinates and each of rightmost coordinates in said each maximum sum subarray.

That is, each of the deviation values of each of the lane element candidates may be calculated by subtracting each average of the values included in each of the lane element candidates from the values of each of the lane element candidates per each of the rows, and said each maximum sum subarray may be determined by referring to each of the deviation values of each of the lane element candidates. Said each average may be positive numbers since it will be calculated as an intermediate value between values corresponding to the lanes and values not corresponding to the lanes. Therefore, the pixels of the lanes may be grouped by each maximum sum subarray.

The Maximum sum subarray may be determine by using a Kadane's algorithm, but not limited thereto.

Figure 5:
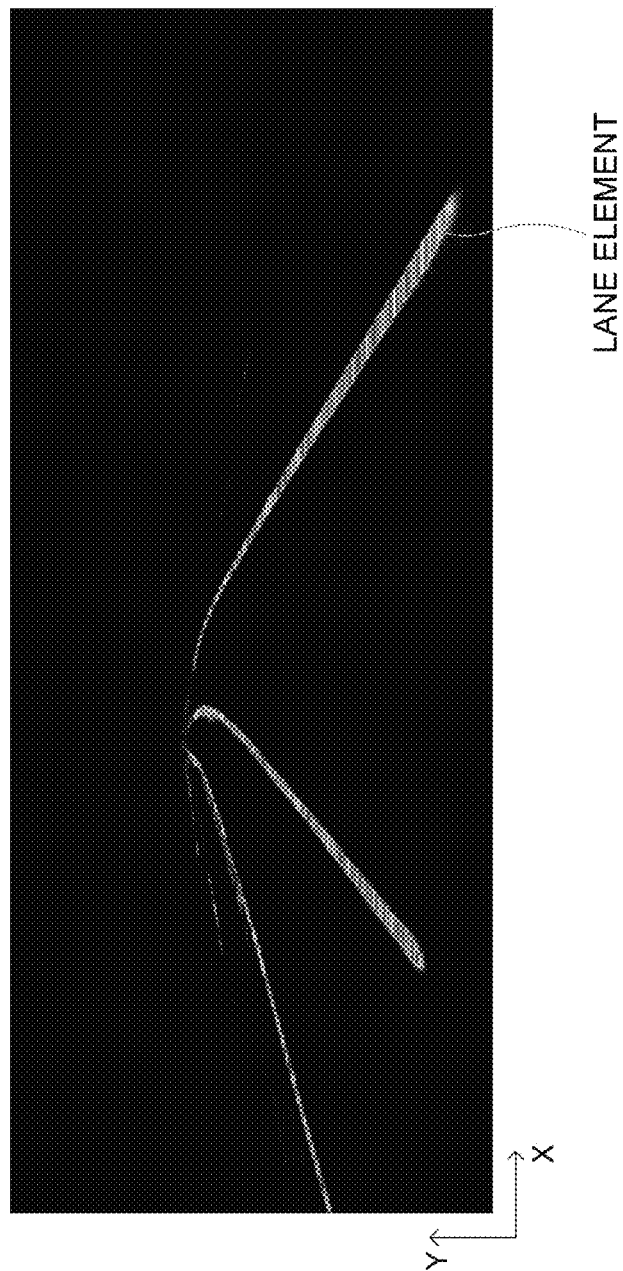
FIG. 5 is an exemplary drawing illustrating the lane elements in accordance with one example embodiment of the present disclosure.

Each of the final left boundary coordinates and each of the final right boundary coordinates of each of the lane element candidates per each of the rows may be detected by applying the estimation operations as stated above, to thereby generate each of the lane elements. Reference is made to FIG. 5 to describe what the lane elements indicate.

FIG. 5 is an exemplary drawing illustrating the lane elements in accordance with one example embodiment of the present disclosure.

By referring to FIG. 5, it is seen that the lane elements are the unit regions including the pixels of the lanes in the input image. More specifically, each of the lane elements may be each of the unit regions including the pixels of the lanes cut along the X-axis direction.

Each of the lane elements may include information on coordinates of its center, left boundary, and right boundary, and on its width, etc. The lane elements may be detected in accordance with the present disclosure as stated above, since the information on the coordinates of its center, left boundary, and right boundary, and on its width, etc. can be generated by referring to each of the final left boundary coordinates and each of the final right boundary coordinates.

When each of the lane elements are detected per each of the rows, the lanes can be detected more accurately by grouping and tracing the lane elements.

The present disclosure has an effect of detecting the lanes easily by detecting the lane elements, which are the unit regions including the pixels of the lanes on the input image, using the horizontal filter mask.

The present disclosure has another effect of providing the estimating methods for detecting the lane elements more easily.

By detecting the lanes in accordance with the present disclosure, the drive path may be optimized for an autonomous vehicle.

It would be understood by one of ordinary skill in the art that a transmission and/or a reception of the above-described images such as the input image, the label image, and one or more additional labels can be performed by the communication part of the computing device, and processes of the convolution operation, the deconvolution operation, and the loss value operation can be mainly performed by the processor of the computing device, but the present disclosure is not limited to these examples.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for detecting one or more lane elements, which are one or more unit regions including pixels of one or more lanes in at least one input image, by using at least one horizontal filter mask, comprising steps of:
   (a) a computing device, if a CNN (convolutional neural network) generates at least one segmentation score map by using the input image, acquiring the segmentation score map;
   (b) the computing device instructing at least one post-processing module, capable of performing data processing at an output end of the CNN, to generate at least one magnitude map by using (i) the segmentation score map and (ii) the horizontal filter mask including a plurality of filtering parameters;
   (c) the computing device instructing the post-processing module to determine each of one or more lane element candidates per each of rows of the segmentation score map by referring to values of the magnitude map; and
   (d) the computing device instructing the post-processing module to apply one or more estimation operations to each of the lane element candidates per each of the rows, to thereby detect each of the lane elements.

2. The method of claim 1, wherein, at the step of (b), the computing device instructs the post-processing module to generate the magnitude map by converting values of the segmentation score map through the horizontal filter mask.

3. The method of claim 2, wherein, assuming that coordinates of values included in a k-th row on the segmentation score map whose size is m×n are (x, k), where x is an integer varying from 1 to m, and k is selected among integers from 1 to n, the computing device instructs the post-processing module to generate the magnitude map which has a same size with the segmentation score map by calculating values of (x, k) on the magnitude map, wherein (i) if x is from 2 to m−1, each of the values of (x, k) on the magnitude map is each of sums of elements of each of element-wise products generated by multiplying values of (x−1, k), (x, k), and (x+1, k) on the segmentation score map and values of [−1, 0, 1] included in the horizontal filter mask, respectively, (ii) if x equals to 1, a value of (x, k) on the magnitude map is a sum of elements of each of element-wise products generated by multiplying values of (x, k) and (x+1, k) on the segmentation score map and values of [0, 1], included in the horizontal filter mask, respectively, and (iii) if x equals to m, a value of (x, k) on the magnitude map is a sum of elements of each of element-wise product generated by multiplying values of (x−1, k) and (x, k) on the segmentation score map and values of [−1, 0], included in the horizontal filter mask, respectively.

4. The method of claim 1, wherein, at the step of (c), the computing device instructs the post-processing module to detect each of initial left boundary coordinates and each of initial right boundary coordinates of each of the lane element candidates per each of the rows by referring to each of absolute values and each of signs of each of the values of the magnitude map corresponding to each of the rows of the segmentation score map, to thereby determine each of the lane element candidates per each of the rows.

5. The method of claim 4, wherein the computing device instructs the post-processing module to determine each of extended lane element candidates per each of the rows by referring to each of adjusted left boundary coordinates and each of adjusted right boundary coordinates whose distances from each of centers of each of the lane element candidates per each of the rows are determined as multiples of distances from each of the centers thereof to each of the initial left boundary coordinates and to each of the initial right boundary coordinates respectively.

6. The method of claim 1, wherein, at the step of (c), the computing device instructs the post-processing module to determine each of the lane element candidates per each of the rows by detecting each of initial left boundary coordinates and each of initial right boundary coordinates of each of the lane element candidates, and
   wherein, at the step of (d), the computing device instructs the post-processing module to apply the estimation operations to each of the lane element candidates per each of the rows, wherein the estimation operations are performed such that (i) each of reference coordinates of each of the lane element candidates per each of the rows is determined as each of coordinates whose value is largest among each of values, on the segmentation map, of each of the lane element candidates per each of the rows larger than a first threshold, and (ii) each of final left boundary coordinates is determined as each of coordinates, whose value is close to a second threshold within a predetermined range, on the left side of each of the reference coordinates, and each of final right boundary coordinates is determined as each of coordinates, whose value is close to a third threshold within a predetermined range, on the right side of each of the reference coordinates.

7. The method of claim 6, wherein the computing device instructs the post-processing module (i) to determine each of reference coordinate candidates whose value is larger than the first threshold among each of the values of each of the lane element candidates per each of the rows of the segmentation score map and (ii) to detect each largest value among each of values of each of the reference coordinate candidates by repeating a process of eliminating each of some values, which is smaller than either its left one or right one, among each of the values of each of the reference coordinate candidates, to thereby determine each of coordinates corresponding to said each largest value as each of the reference coordinates of each of the lane element candidates per each of the rows.

8. The method of claim 1, wherein, at the step of (c), the computing device instructs the post-processing module to determine each of the lane element candidates per each of the rows by detecting each of initial left boundary coordinates and each of initial right boundary coordinates of each of the lane element candidates, and wherein, at the step of (d), the computing device instructs the post-processing module to apply the estimation operations to each of the lane element candidates per each of the rows, wherein the estimation operations are performed such that (i) each sample width per each of the rows of the segmentation score map is determined by referring to information on a predetermined lane width, (ii) each of sub groups, whose width corresponds to said each sample width, is generated by using each of values of each of the lane element candidates per each of the rows on the segmentation score map, (iii) each difference is calculated between each of averages of each of values included in each of the sub groups and that of values, on the segmentation score map, which are not included in said each of the sub groups, to thereby determine each of representative sub groups per each of the rows, and (iv) each of final left boundary coordinates is determined as each of coordinates whose value is close to a threshold value within a predetermined range in a left part of each of the representative sub groups, and each of final right boundary coordinates is determined as each of coordinates whose value is close to the threshold value within a predetermined range in a right part of each of the representative sub groups.

9. The method of claim 1, wherein, at the step of (c), the computing device instructs the post-processing module to determine each of the lane element candidates per each of the rows by detecting each of initial left boundary coordinates and each of initial right boundary coordinates of each of the lane element candidates, and wherein, at the step of (d), the computing device instructs the post-processing module to apply the estimation operations to each of the lane element candidates per each of the rows, wherein the estimation operations are performed such that each maximum sum subarray is determined where each of sums of deviation values of each of the lane element candidates per each of the rows is largest, and each of final left boundary coordinates and each of final right boundary coordinates are determined respectively as each of leftmost coordinates and each of rightmost coordinates in said each maximum sum subarray.

10. The method of claim 1, wherein, at the step of (c), the computing device instructs the post-processing module to determine each of the lane element candidates per each of the rows by detecting each of initial left boundary coordinates and each of initial right boundary coordinates of each of the lane element candidates, and wherein, at the step of (d), the computing device instructs the processing module to detect each of final left boundary coordinates and each of final right boundary coordinates of each of the lane element candidates per each of the rows by applying the estimation operations to the segmentation score map, and refer to each of the final left boundary coordinates and each of the final right boundary coordinates of each of the lane element candidates per each of the rows, to thereby generate each of the lane elements.

11. A computing device for detecting one or more lane elements, which are one or more unit regions including pixels of one or more lanes in at least one input image, by using at least one horizontal filter mask, comprising:

at least one memory that stores instructions; and
at least one processor configured to execute the instructions to: perform processes of (I) if the segmentation score map which has been generated through a CNN by using the input image is acquired, instructing at least one post-processing module, capable of performing data processing at an output end of the CNN, to generate at least one magnitude map by using (i) the segmentation score map and (ii) the horizontal filter mask including a plurality of filtering parameters, (II) instructing the post-processing module to determine each of one or more lane element candidates per each of rows of the segmentation score map by referring to values of the magnitude map, and (III) instructing the post-processing module to apply one or more estimation operations to each of the lane element candidates per each of the rows, to thereby detect each of the lane elements.

12. The computing device of claim 11, wherein, at the process of (I), the processor instructs the post-processing module to generate the magnitude map by converting values of the segmentation score map through the horizontal filter mask.

13. The computing device of claim 12, wherein, assuming that coordinates of values included in a k-th row on the segmentation score map whose size is m×n are $(x, k)$, where x is an integer varying from 1 to m, and k is selected among integers from 1 to n, the processor instructs the post-processing module to generate the magnitude map which has a same size with the segmentation score map by calculating values of $(x, k)$ on the magnitude map, wherein (i) if x is from 2 to m−1, each of the values of $(x, k)$ on the magnitude map is each of sums of elements of each of element-wise products generated by multiplying values of $(x−1, k)$, $(x, k)$, and $(x+1, k)$ on the segmentation score map and values of $[-1, 0, 1]$ included in the horizontal filter mask, respectively, (ii) if x equals to 1, a value of $(x, k)$ on the magnitude map is a sum of elements of each of element-wise products generated by multiplying values of $(x, k)$ and $(x+1, k)$ on the segmentation score map and values of $[0, 1]$, included in the horizontal filter mask, respectively, and (iii) if x equals to m, a value of (x, k) on the magnitude map is a sum of elements of each of element-wise product generated by multiplying values of (x−1, k) and (x, k) on the segmentation score map and values of [−1, 0], included in the horizontal filter mask, respectively.

14. The computing device of claim 11, wherein, at the process of (II), the processor instructs the post-processing module to detect each of initial left boundary coordinates and each of initial right boundary coordinates of each of the lane element candidates per each of the rows by referring to each of absolute values and each of signs of each of the values of the magnitude map corresponding to each of the rows of the segmentation score map, to thereby determine each of the lane element candidates per each of the rows.

15. The computing device of claim 14, wherein the processor instructs the post-processing module to determine each of extended lane element candidates per each of the rows by referring to each of adjusted left boundary coordinates and each of adjusted right boundary coordinates whose distances from each of centers of each of the lane element candidates per each of the rows are determined as multiples of distances from each of the centers thereof to each of the initial left boundary coordinates and to each of the initial right boundary coordinates respectively.

16. The computing device of claim 11, wherein, at the process of (II), the processor instructs the post-processing module to determine each of the lane element candidates per each of the rows by detecting each of initial left boundary coordinates and each of initial right boundary coordinates of each of the lane element candidates, and wherein, at the process of (III), the processor instructs the post-processing module to apply the estimation operations to each of the lane element candidates per each of the rows, wherein the estimation operations are performed such that (i) each of reference coordinates of each of the lane element candidates per each of the rows is determined as each of coordinates whose value is largest among each of values, on the segmentation map, of each of the lane element candidates per each of the rows larger than a first threshold, and (ii) each of final left boundary coordinates is determined as each of coordinates, whose value is close to a second threshold within a predetermined range, on the left side of each of the reference coordinates, and each of final right boundary coordinates is determined as each of coordinates, whose value is close to a third threshold within a predetermined range, on the right side of each of the reference coordinates.

17. The computing device of claim 16, wherein the processor instructs the post-processing module (i) to determine each of reference coordinate candidates whose value is larger than the first threshold among each of the values of each of the lane element candidates per each of the rows of the segmentation score map and (ii) to detect each largest value among each of values of each of the reference coordinate candidates by repeating a process of eliminating each of some values, which is smaller than either its left one or right one, among each of the values of each of the reference coordinate candidates, to thereby determine each of coordinates corresponding to said each largest value as each of the reference coordinates of each of the lane element candidates per each of the rows.

18. The computing device of claim 11, wherein, at the process of (II), the processor instructs the post-processing module to determine each of the lane element candidates per each of the rows by detecting each of initial left boundary coordinates and each of initial right boundary coordinates of each of the lane element candidates, and wherein, at the process of (III), the processor instructs the post-processing module to apply the estimation operations to each of the lane element candidates per each of the rows, wherein the estimation operations are performed such that (i) each sample width per each of the rows of the segmentation score map is determined by referring to information on a predetermined lane width, (ii) each of sub groups, whose width corresponds to said each sample width, is generated by using each of values of each of the lane element candidates per each of the rows on the segmentation score map, (iii) each difference is calculated between each of averages of each of values included in each of the sub groups and that of values, on the segmentation score map, which are not included in said each of the sub groups, to thereby determine each of representative sub groups per each of the rows, and (iv) each of final left boundary coordinates is determined as each of coordinates whose value is close to a threshold value within a predetermined range in a left part of each of the representative sub groups, and each of final right boundary coordinates is determined as each of coordinates whose value is close to the threshold value within a predetermined range in a right part of each of the representative sub groups.

19. The computing device of claim 11, wherein, at the process of (II), the processor instructs the post-processing module to determine each of the lane element candidates per each of the rows by detecting each of initial left boundary coordinates and each of initial right boundary coordinates of each of the lane element candidates, and wherein, at the process of (III), the processor instructs the post-processing module to apply the estimation operations to each of the lane element candidates per each of the rows, wherein the estimation operations are performed such that each maximum sum subarray is determined where each of sums of deviation values of each of the lane element candidates per each of the rows is largest, and each of final left boundary coordinates and each of final right boundary coordinates are determined respectively as each of leftmost coordinates and each of rightmost coordinates in said each maximum sum subarray.

20. The computing device of claim 11, wherein, at the process of (II), the processor instructs the post-processing module to determine each of the lane element candidates per each of the rows by detecting each of initial left boundary coordinates and each of initial right boundary coordinates of each of the lane element candidates, and wherein, at the process of (III), the processor instructs the processing module to detect each of final left boundary coordinates and each of final right boundary coordinates of each of the lane element candidates per each of the rows by applying the estimation operations to the segmentation score map, and refer to each of the final left boundary coordinates and each of the final right boundary coordinates of each of the lane element candidates per each of the rows, to thereby generate each of the lane elements.

* * * * *